United States Patent
Jung et al.

(10) Patent No.: US 10,412,392 B2
(45) Date of Patent: Sep. 10, 2019

(54) APPARATUS AND METHOD FOR ENCODING VIDEO AND ADJUSTING A QUANTIZATION PARAMETER

(71) Applicant: Samsung Electronics Co., Ltd., Suwon-si, Gyeonggi-do (KR)

(72) Inventors: Young-beom Jung, Seoul (KR); Hyuk-jae Jang, Suwon-si (KR); Yo-won Jeong, Anyang-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 10 days.

(21) Appl. No.: 15/684,172

(22) Filed: Aug. 23, 2017

(65) Prior Publication Data
US 2018/0184092 A1   Jun. 28, 2018

(30) Foreign Application Priority Data

Dec. 22, 2016  (KR) .................. 10-2016-0176847

(51) Int. Cl.
| | |
|---|---|
| *H04N 19/154* | (2014.01) |
| *H04N 19/124* | (2014.01) |
| *H04N 19/147* | (2014.01) |
| *H04N 19/19* | (2014.01) |
| *H04N 19/61* | (2014.01) |

(52) U.S. Cl.
CPC ......... *H04N 19/154* (2014.11); *H04N 19/124* (2014.11); *H04N 19/147* (2014.11); *H04N 19/19* (2014.11); *H04N 19/61* (2014.11)

(58) Field of Classification Search
CPC .. H04N 19/154; H04N 19/124; H04N 19/147; H04N 19/19; H04N 19/61

USPC ........................................................ 375/240
See application file for complete search history.

(56) References Cited

U.S. PATENT DOCUMENTS

| | | | |
|---|---|---|---|
| 8,139,881 B2 | 3/2012 | Huguenel et al. | |
| 8,175,149 B2 | 5/2012 | Jun et al. | |
| 8,396,118 B2 | 3/2013 | Auyeung | |
| 8,581,987 B1 | 11/2013 | Chu et al. | |
| 9,215,467 B2 | 12/2015 | Cheok et al. | |
| 9,294,771 B2 | 3/2016 | Gish et al. | |
| 2009/0074315 A1 | 3/2009 | Mu | |
| 2014/0119432 A1 | 5/2014 | Wang | |
| 2015/0249833 A1* | 9/2015 | Tourapis | H04N 19/154 375/240.03 |

(Continued)

OTHER PUBLICATIONS

Chuohao Yeo et al.. "On Rate Distortion Optimization Using SSIM". IEEE Transactions on Circuits and Systems for Video Technology vol. 23, No. 7. Jul. 2013. pp. 1170-1175.

(Continued)

*Primary Examiner* — Hee-Yong Kim
(74) *Attorney, Agent, or Firm* — Harness, Dickey & Pierce, P.L.C.

(57) ABSTRACT

According to at least some example embodiments of the inventive concepts, an apparatus for encoding video includes a quantizer configured to, based on a size of an initial quantization parameter of input data, generate output data by quantizing the input data to increase an objective evaluation value of encoded data generated from the output data, or generate the output data by quantizing the input data to increase a subjective evaluation value of the encoded data.

20 Claims, 12 Drawing Sheets

(56) References Cited

U.S. PATENT DOCUMENTS

2018/0139450 A1* 5/2018 Gao .................... H04N 19/147

OTHER PUBLICATIONS

Hung-Ju Lee et al. "Scalable Rate Control for MPEG-4 Video". IEEE Transactions on Circuits and Systems for Video Technology, vol. 10, No. 6. Sep. 2000. pp. 878-894.
Do-Kyoung Kwon et al. "Rate Control for H.264 Video with Enhanced Rate and Distortion Models". IEEE Transactions on Circuits and Systems for Video Technology, vol. 17, No. 5. May 2007. pp. 517-529.
Bin Li et al. "Domain Rate Control Algorithm for High Efficiency Video Coding". IEEE Transactions on Image Processing, vol. 23, No. 9. Sep. 2014. pp. 3841-3854.
Chuohao Yeo et al. "SSIM-Based Adaptive Quantizations in HEVC". Acoustics, Speech and Signal Processing (ICASSP), IEEE International Conferences. IEEE Xplore Digital Library. 2013. pp. 1690-1694.
Zhou Wang et al. "Multi-Scale Structural Similarity for Image Quality Assessment". IEEE. Proceedings of the 37th IEEE Asilomar Conference on Signals, Systems and Computers. Nov. 9-12, 2003. pp. 1-5.

\* cited by examiner

APPARATUS AND METHOD FOR ENCODING VIDEO AND ADJUSTING A QUANTIZATION PARAMETER

CROSS-REFERENCE TO RELATED APPLICATION

This application claims priority under 35 U.S.C. § 119 to Korean Patent Application No. 10-2016-0176847, filed on Dec. 22, 2016, in the Korean Intellectual Property Office, the disclosure of which is incorporated herein in its entirety by reference.

BACKGROUND

At least some example embodiments of the inventive concepts relate to video encoding, and more particularly, to video encoding apparatuses and methods adjusting quantization parameters.

Video encoding may refer to a process of generating encoded data having a smaller size than original data from the original data, that is, image data or video data including a series of image data. Decoded data generated by decoding encoded data or a bitstream may be identical to or different from original data according to video encoding methods. For example, data decoded from encoded data according to lossless compression may be identical to original data, while data decoded from encoded data according to lossy compression may be different from original data.

It is one of the main objects of video encoding to reduce the difference between decoded data and original data while reducing the size of data encoded according to lossy compression, that is, the bitrate of a bitstream. Accordingly, it is necessary to provide video encoding for accurately measuring distortion in decoded data from original data and reducing the measured distortion.

SUMMARY

At least some example embodiments of the inventive concepts provide video encoding apparatuses and methods and provides apparatuses and methods of providing a standard for accurately evaluating decoded data in the relationship with original data and encoding the original data in accordance with the standard.

According to at least some example embodiments of the inventive concepts, an apparatus for encoding video includes a quantizer configured to, based on a size of an initial quantization parameter of input data, generate output data by quantizing the input data to increase an objective evaluation value of encoded data generated from the output data, or generate the output data by quantizing the input data to increase a subjective evaluation value of the encoded data.

According to at least some example embodiments of the inventive concepts, an apparatus for encoding video includes a quantization parameter generator configured to, perform a comparison operation based on an initial quantization parameter of input data and at least one reference value, and generate, based on a result of the comparison operation, a final quantization parameter such that the final quantization parameter is a quantization parameter for increasing a structural similarity index (SSIM) of encoded data generated from output data or a quantization parameter for increasing a peak signal-to-noise ratio (PSNR) of encoded data generated from the output data; and a quantization processor configured to generate the output data by quantizing the input data according to the final quantization parameter.

According to at least some example embodiments of the inventive concepts, a video encoding method includes comparing an initial quantization parameter of input data with at least one reference value; generating a final quantization parameter for increasing a structural similarity index (SSIM) or a peak signal-to-noise ratio (PSNR) of encoded data generated from output data according to a comparison result thereof; and generating the output data by quantizing the input data according to the final quantization parameter.

According to at least some example embodiments of the inventive concepts, a video encoder includes a quantization parameter generator configured to generate, based on a variance of original video data and an initial quantization parameter, a final quantization parameter; and a quantization processor configured to generate output video data by quantizing input video data according to the final quantization parameter, the input video data being a transformed version of at least a portion of the original video data.

BRIEF DESCRIPTION OF THE DRAWINGS

The above and other features and advantages of example embodiments of the inventive concepts will become more apparent by describing in detail example embodiments of the inventive concepts with reference to the attached drawings. The accompanying drawings are intended to depict example embodiments of the inventive concepts and should not be interpreted to limit the intended scope of the claims. The accompanying drawings are not to be considered as drawn to scale unless explicitly noted.

DETAILED DESCRIPTION

Figure 1:
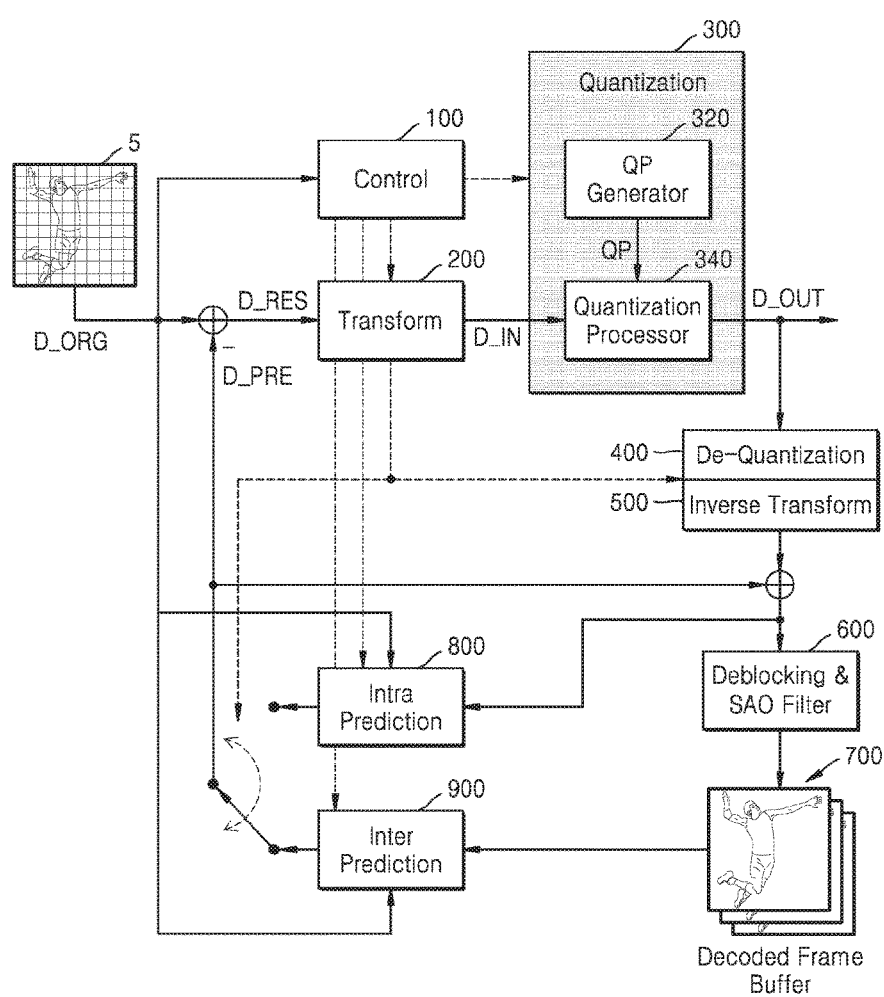
FIG. 1 is a block diagram illustrating an apparatus for encoding video according to at least one example embodiment of the inventive concepts.

As is traditional in the field of the inventive concepts, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, according to at least some example embodiments of the inventive concepts, each block, unit and/or module of the embodiments may be physically separated into two or more interacting and discrete blocks, units and/or modules. Further, according to at least some example embodiments of the inventive concepts, the blocks, units and/or modules of the embodiments may be physically combined into more complex blocks, units and/or modules.

FIG. 1 is a block diagram illustrating an apparatus 10 for encoding video according to at least one example embodiment of the inventive concepts. The apparatus 10 may be one of various apparatuses processing video data. For example, the apparatus 10 may be an apparatus including a display outputting video data, such as a mobile phone, a desktop personal computer (PC), a laptop PC, or a tablet PC, may be an apparatus including a camera module generating video data, such as a digital camera, a digital camcorder, or a smart phone, and may be a server performing video encoding in order to transmit data through a communication channel such as a network. Also, the apparatus 10 may include one or more semiconductor chips as components included in the above apparatuses, and may include a computer-readable storage medium storing software including instructions executed by a central processing unit (CPU) or a graphics processing unit (GPU) in order to perform video encoding. Hereinafter, although the apparatus 10 is referred to as a video encoder, it will be understood that the apparatus 10 may be an apparatus including a video encoder.

FIG. 1 illustrates only some of the modules included in a video encoder 10, and the video encoder 10 may generate encoded data, that is, a coded bitstream by encoding original video data 5. As illustrated in FIG. 1, the video encoder 10 may include a plurality of modules such as a control module 100, a transform module 200, a quantization module 300, a dequantization module 400, an inverse transform module 500, a deblocking/sample adaptive offset (SAO) filter module 600, a decoded frame buffer 700, an intra prediction module 800, and an inter prediction module 900, and may include operation blocks performing data addition or subtraction. According to at least some example embodiments of the inventive concepts, operations described as being performed by the video encoder 10 (and/or any element of the video encoder 10) may be performed by circuitry configured to perform the operations, a processor executing program code that is stored in a memory and includes instructions corresponding to the operations, or a combination of the above-referenced circuitry and processor executing program code. The processor executing program code may be, for example, a hardware-implemented data processing device having circuitry that is physically structured to execute desired operations including, for example, operations represented as code and/or instructions included in a program. Examples of the above-referenced hardware-implemented data processing device include, but are not limited to, a microprocessor, a central processing unit (CPU), a processor core, a multi-core processor; a multi-processor, an application-specific integrated circuit (ASIC), and a field programmable gate array (FPGA). Processors executing program code are programmed processors, and thus, are special-purpose computers.

The control module 100 may control video encoding. For example, the control module 100 may receive the original video data 5 and may transmit control signals to other modules included in the video encoder 10, as indicated by dashed lines in FIG. 1. Although not illustrated in FIG. 1, the control module 100 may output control data, and the control data may be included in the bitstream generated by the video encoder 10.

The transform module 200 may generate input data D_IN by transforming residual data D_RES that is a difference between original data D_ORG and prediction data D_PRE. For example, the transform module 200 may generate the input data D_IN by performing a discrete cosine transform (DCT) on the residual data D_RES, and accordingly, space-domain input data D_IN may be transformed into frequency-domain input data D_IN. Input data D_IN may also be referred to, herein, as input video data. Original data D_ORG may also be referred to, herein, as original video data. According to at least some example embodiments original data D_ORG includes a block among a plurality of blocks included in an image frame.

The quantization module (or quantizer) 300 may generate output data D_OUT by quantizing the input data D_IN. For example, the quantization module 300 may quantize the input data D_IN according to a quantization parameter QP. As described below, according to at least one example embodiment of the inventive concepts, the quantization module 300 may generate a quantization parameter QP adjusted to improve actual video quality of data decoded from the bitstream, that is, the encoded data generated from the output data D_OUT, and may generate the output data D_OUT by quantizing the input data D_IN according to the quantization parameter QP. According to at least some example embodiments of the inventive concepts, the quantization module 300 may be configured to output the output data D_OUT as a bitstream. The output data D_OUT may also be referred to, herein, as output video data. As illustrated in FIG. 1, the quantization module 300 may include a quantization parameter generator 320 and a quantization processor 340.

The quantization parameter generator 320 may generate a quantization parameter QP for improving actual video quality of data decoded from the bitstream. For example, the quantization parameter generator 320 may compare an initial quantization parameter (e.g., QP0 of FIG. 6) with at least one reference value (e.g., REF of FIG. 6) and may generate a quantization parameter QP for increasing an objective evaluation value or a subjective evaluation value of the bitstream according to a comparison result thereof. The quantization parameter generated by the quantization parameter generator 320 may also be referred to as a final quantization parameter QP.

An objective evaluation value and a subjective evaluation value may be used in video quality evaluation or distortion measurement. The objective evaluation value may be based on a pixel pointwise error of video data. For example, the objective evaluation value may include a mean square error (MSE), a mean absolute error (MAE), a peak signal-to-noise ratio (PSNR), a root mean squared error (RMSE), and a signal-to-noise ratio (SNR). The subjective evaluation value may be based on the content represented by video data. For example, the subjective evaluation value may include a structural similarity (SSIM) and a multiscale SSIM (MS-SSIM). As described below, the quantization parameter QP may be generated by considering a quality index QI (e.g., QI of FIG. 2) for measuring actual video quality, which is defined based on both the objective evaluation value and the subjective evaluation value, instead of by only taking into account one of the objective evaluation value and the subjective evaluation value. Details of the quality index QI will be described below with reference to FIG. 2.

The quantization processor 340 may generate the output data D_OUT by quantizing the input data D_IN according to the quantization parameter QP. For example, the quantization processor 340 may quantize the input data D_IN by using a quantization matrix, and a quantization level of the input data D_IN may be adjusted by determining the quantization matrix according to the quantization parameter QP. According to at least some example embodiments of the inventive concepts, the output data D_OUT may be output from the quantization processor 340 in the form of a bitstream.

The dequantization module 400 and the inverse transform module 500 may perform an inverse operation of the quantization module 300 and the transform module 200. For example, the dequantization module 400 may dequantize the output data D_OUT, and the inverse transform module 500 may generate space-domain data by inverse-transforming frequency-domain data, that is, the data generated by the dequantization module 400. The data generated by the inverse transform module 500 may be restored residual data.

The deblocking/SAO filter module 600 and the decoded frame buffer 700 may generate and store decoded frame data for inter prediction. The deblocking/SAO filter module 600 may filter the data equal to the sum of the prediction data D_PRE and the residual data restored by the dequantization module 400 and the inverse transform module 500, and accordingly, errors caused by blocks constituting one frame may be reduced and thus frame data representing a more realistic image may be generated. The decoded frame buffer 700 may store the frame data generated by the deblocking/SAO filter module 600 and may provide the stored frame data to the inter prediction module 900.

The intra prediction module 800 may generate intra prediction data based on the original data D_ORG and the data equal to the sum of the prediction data D_PRE and the residual data restored by the dequantization module 400 and the inverse transform module 500. For example, the intra prediction module 800 may generate the intra prediction data by performing intra-frame estimation and intra-frame prediction.

The inter prediction module 900 may generate inter prediction data based on the original data D_ORG and the frame data received from the decoded frame buffer 700. For example, the inter prediction module 900 may generate the inter prediction data by performing motion estimation and motion compensation.

One of the intra prediction data and the inter prediction data may be selected as the prediction data D_PRE by the control module 100, and it may be used to generate the residual data D_RES from the original data D_ORG.

In FIG. 1, the original data D_ORG may be one of the blocks constituting one frame of the original video data 5. That is, the original video data 5 including a plurality of frames may be encoded on a block-by-block basis for each frame, and accordingly, the original data D_ORG, the prediction data D_PRE, the residual data D_RES, the input data D_IN, and the output data D_OUT may correspond to one block. The quantization parameter generator 320 of the quantization module 300 may generate the quantization parameter QP corresponding to the block. That is, the quantization parameter QP may be generated to have a different value for each block.

Figure 2:
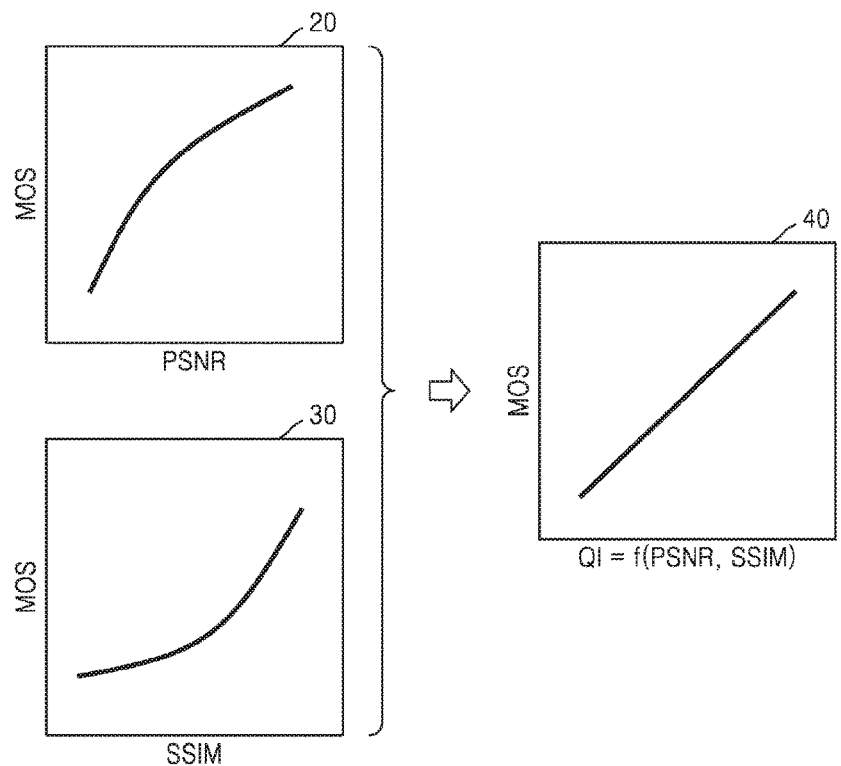
FIG. 2 illustrates graphs showing a quality index according to at least one example embodiment of the inventive concepts.

FIG. 2 illustrates graphs showing a quality index QI according to at least one example embodiment of the inventive concepts. In order to evaluate the performance of a video encoder, (i) data generated by decoding video data encoded by the video encoder and (ii) corresponding original video data, that is, input data of the video encoder, may be used to evaluate video quality. The decoded video data may be, for example, a version of the original video data that has been encoded by the video encoder and subsequently decoded.

According to at least some example embodiments of the inventive concepts, an experiment may be conducted in which several sets of video data are evaluated. Each set of video data includes decoded video data and corresponding original video data. The evaluation may include determining Mean opinion scores (MOSs), PSNR and SSIM values for the sets of video data. Additionally, the MOSs may be compared to the PSNR and SSIM values. For example, a graph 20 represents the relationship between a mean opinion score (MOS) and a PSNR according to the experiment result, a graph 30 represents the relationship between an MOS and an SSIM according to the experiment result, and a graph 40 represents the relationship between an MOS and a quality index QI.

The MOS refers to an evaluation score given by a sample group of persons, and the video quality improves as the MOS increases. The experiment results show that the relationship between an MOS and an objective evaluation value or the relationship between an MOS and a subjective evaluation value may be nonlinear. For example, an increment of the MOS may decrease as the PSNR as an example of the objective evaluation value increases, as illustrated in the graph 20, while an increment of the MOS may increase as the SSIM as an example of the subjective evaluation value increases, as illustrated in the graph 30. Accordingly, it may not be practical to evaluate the video quality only by the objective evaluation value or only by the subjective evaluation value, and video encoding also may not promote improving actual video quality when it is designed to improve only the objective evaluation value or only the subjective evaluation value. Thus, a numerical value having a linear relationship with the MOS may be suitable for evaluating the video quality, and the quality index QI may be defined as described below.

The quality index QI may have a substantially linear relationship with the MOS and may be defined as a function of the objective evaluation value and the subjective evaluation value. For example, as illustrated in FIG. 2, the quality index QI may be defined as a function f of the PSNR as an example of the objective evaluation value and the SSIM as an example of the subjective evaluation value. According to at least one example embodiment of the inventive concepts, the function f may represent a weighted sum of the PSNR and the SSIM, and the quality index QI may be defined as Equation 1 below.

$$QI = W_1 \cdot PSNR + W_2 \cdot SSIM \quad \text{Equation 1}$$

In Equation 1, a first weight W1 and a second weight W2 may be set such that the quality index QI and the MOS have a substantially linear relationship. Since the PSNR may have an infinite value by definition (PSNR=10 log(s2/MSE)), the PSNR may be restricted to an upper limit in the weighted sum for calculating the quality index QI. That is, when the upper limit of the PSNR is 'MaxVal', the quality index QI may be defined as Equation 2 below. According to at least some example embodiments, 'MaxVal' may be a desired or, alternatively, predetermined upper limit of the PSNR.

$$QI = W_1 \cdot \min(PSNR, MaxVal) + W_2 \cdot SSIM \quad \text{Equation 2}$$

According to at least one example embodiment of the inventive concepts, 'MaxVal' may be 50. Since the SSIM may have a value of 0 to 1 by definition, in order to match the range of the PSNR with the range of the SSIM, the second weight W2 may include a scale factor C and the scale factor C may match, for example, with the upper limit 'MaxVal' of the PSNR. Accordingly, the second weight W2 may be the product of the scale factor C and an SSIM factor WS set such that the sum with the first weight W1 is constant (e.g., at 1). That is, the quality index QI may be defined as Equation 3 below.

$$QI = W_1 \cdot \min(PSNR, MaxVal) + C \cdot W_S \cdot SSIM;$$

$$W_1 + W_S = 1.$$

The video encoder 10 of FIG. 1 may perform video encoding to increase the above quality index QI. For example, the quantization parameter generator 320 of the quantization module 300 of FIG. 1 may generate the quantization parameter QP to increase the quality index QI of the bitstream (i.e., encoded data) generated from the output data D_OUT. For this purpose, the PSNR and the SSIM may be represented as functions of the quantization parameter QP as described below with reference to FIGS. 4A and 4B, and functions obtained by differentiating functions, which are used to determine one of the PSNR and the SSIM to be increased by the quantization parameter QP to increase the quality index QI, may be used as described below with reference to FIG. 5. Hereinafter, although embodiments are described by using the PSNR as an example of the objective evaluation value and the SSIM as an example of the subjective evaluation value, it will be understood that at least some example embodiments of the inventive concepts are not limited thereto.

Figure 3:
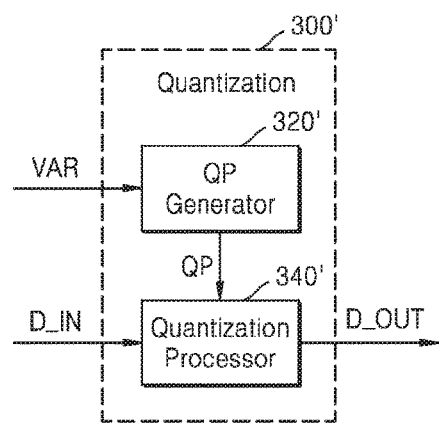
FIG. 3 is a block diagram illustrating an example of a quantization module of FIG. 1 according to at least one example embodiment of the inventive concepts.

FIG. 3 is a block diagram illustrating an example of the quantization module 300 of FIG. 1 according to at least one example embodiment of the inventive concepts. As described above with reference to FIG. 1, a quantization module 300' of FIG. 3 may generate the output data D_OUT by quantizing the input data D_IN according to the quantization parameter QP. As illustrated in FIG. 3, the quantization module 300' may include a quantization parameter generator 320' and a quantization processor 340'. Operations described as being performed by the quantization module 300' (and/or any element of the quantization module 300') may be performed by circuitry configured to perform the operations, a processor executing program code that is stored in a memory and includes instructions corresponding to the operations, or a combination of the above-referenced circuitry and processor executing program code.

The quantization parameter generator 320' may receive a variance VAR of the original data D_ORG. The variance VAR may be a variance of the pixels included in the original data D_ORG. The variance VAR may be calculated from at least one of values, which each of the pixels has, for example, brightness, luminosity, red value, blue value and green value, etc. The variance VAR may also be referred to, herein, as a variance of original data, or an original data variance. The quantization parameter generator 320' may receive the variance VAR from the control module 100 of FIG. 1 (e.g., after the control module 100 calculates the variance VAR of the original data D_ORG), or may receive the original data D_ORG and calculate the variance VAR from the received original data D_ORG, unlike the illustration of FIG. 3. The quantization parameter generator 320' may generate at least one reference value by using a reference value function defined based on the first and second weights W1 and W2 of the quality index QI as a function of the variance VAR. The quantization parameter generator 320' may compare the initial quantization parameter with at least one reference value and generate a quantization parameter QP for increasing the PSNR or a quantization parameter QP for increasing the SSIM according to a comparison result thereof. The quantization parameter QP generated by the quantization parameter generator 320' may also be referred to as a final quantization parameter QP.

Like the quantization processor 340 of FIG. 1, the quantization processor 340' may generate the output data D_OUT by quantizing the input data D_IN by using a quantization matrix determined by the quantization parameter QP.

Figure 4A:
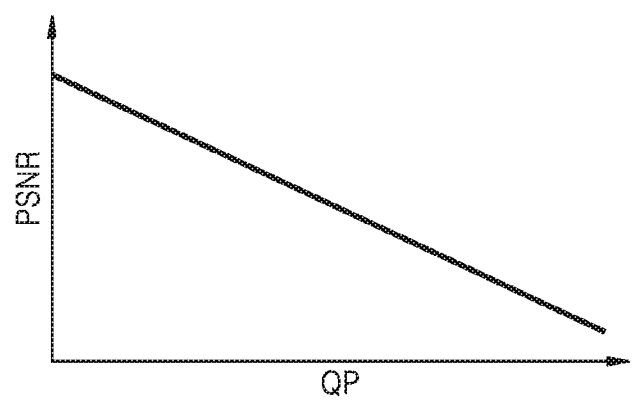
FIGS. 4A and 4B illustrate graphs representing a peak signal-to-noise ratio (PSNR) and an structural similarity (SSIM) as functions of a quantization parameter according to at least one example embodiment of the inventive concepts.
Figure 4B:
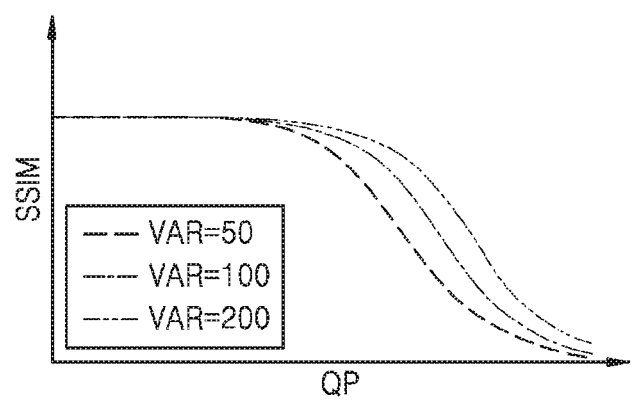
Figure 5:
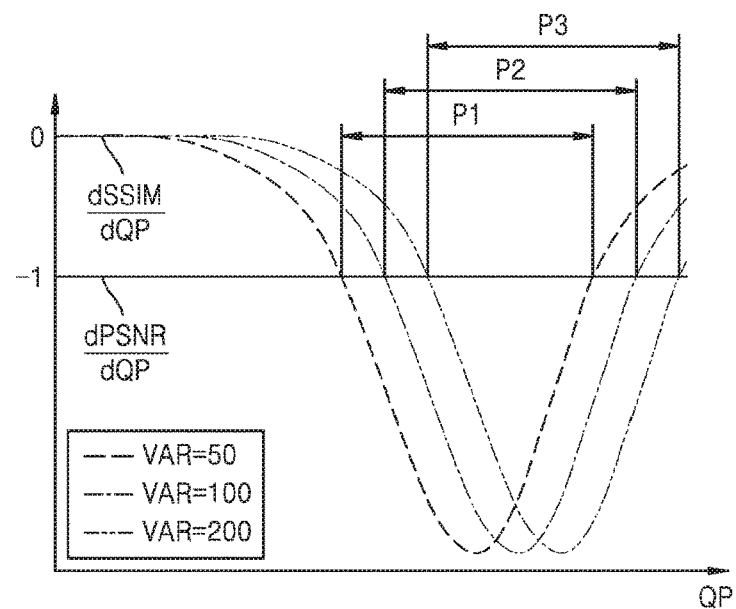
FIG. 5 is a graph illustrating functions obtained by differentiating the PSNR and the SSIM of FIG. 4 by a quantization parameter according to at least one example embodiment of the inventive concepts.

FIGS. 4A and 4B illustrate graphs representing the PSNR and the SSIM as functions of the quantization parameter QP according to at least one example embodiment of the inventive concepts. FIG. 5 is a graph illustrating functions obtained by differentiating the PSNR and the SSIM of FIGS. 4A and 4B by the quantization parameter QP according to at least one example embodiment of the inventive concepts. In detail, FIG. 4A is a graph representing the PSNR as a function of the quantization parameter QP, and FIG. 4B is a graph representing the SSIM as a function of the quantization parameter QP.

The MSE may be represented as a function of the quantization parameter QP as in Equation 4 below. In Equation 4, 'a' is a constant depending on a rounding offset, and for example, when the rounding offset is ½, ⅓, and ⅙, 'a' may be 1/12, 1/9, and 7/36, respectively.

$$MSE \approx \alpha \cdot 2^{\frac{QP-4}{3}} \quad \text{Equation 4}$$

When the full scale of a pixel is 255, the PSNR may be represented as a function of the quantization parameter QP as in Equation 5 below. That is, the PSNR may be approximately represented as a first-order function of the quantization parameter QP.

$$PSNR = 10\log_{10}\left(\frac{255^2}{MSE}\right) \approx 10\log_{10}\left(\frac{255^2}{\alpha}\right) - 10\log_{10}2 \times \frac{QP-4}{3} \quad \text{Equation 5}$$

According to "On Rate Distortion Optimization Using SSIM" (C. Yeo, H. L. Tan, and Y. H. Tan, IEEE Trans. CIRCUITS AND SYSTEMS FOR VIDEO TECHNOLOGY, Vol. 23, no. 7, pp. 1170-1181, July 2013), the SSIM may be represented as a function of the quantization parameter QP as in Equation 6 below. In Equation 6, '$\sigma^2$' may denote a variance (i.e., VAR) of the original data D_ORG, and '$c_2$' may be a constant for numerical stability used in the definition of the SSIM.

$$SSIM \approx \frac{2\sigma^2 + c_2}{2\sigma^2 + MSE + c_2} \quad \text{Equation 6}$$

Accordingly, when the MSE of Equation 4 is substituted in Equation 6, the SSIM may be represented as a function of the quantization parameter QP as in Equation 7 below.

$$SSIM \approx \frac{2\sigma^2 + c_2}{2\sigma^2 + \alpha \cdot 2^{\frac{QP-4}{3}} + c_2} = \frac{\beta}{\beta + \gamma \times 2^{\frac{QP}{3}}} \quad \text{Equation 7}$$

$$\left(\beta = 2\sigma^2 + c_2, \gamma = \alpha \times 2^{\frac{4}{3}}\right)$$

Referring to Equations 5 and 7, unlike the PSNR that is a first-order function of the quantization parameter QP, as illustrated in FIG. 4A, the SSIM may vary according to both the quantization parameter QP and the variance VAR '$\sigma 2$' of the original data D_ORG, as illustrated in FIG. 4B.

According to at least one example embodiment of the inventive concepts, in order to evaluate the sensitivity of each of the PSNR and the SSIM forming the quality index QI with respect to the quantization parameter QP, differential functions obtained by differentiating the PSNR of Equation 5 and the SSIM of Equation 7 by the quantization parameter QP may be represented as Equations 8 and 9 below.

$$\frac{dPSNR}{dQP} \approx -\frac{10}{3}\log_{10}2 \approx -1 \quad \text{Equation 8}$$

$$\frac{dSSIM}{dQP} \approx \frac{\beta}{\left(\beta + \gamma \times 2^{\frac{QP}{3}}\right)^2} \times \gamma \times 2^{\frac{QP}{3}} \times \ln 2^{\frac{1}{3}} \quad \text{Equation 9}$$

Referring to Equations 8 and 9, as illustrated in FIG. 5, the differential function of the PSNR may have a substantially constant value (i.e., −1), while the differential function of the SSIM may vary according to the QP and may intersect the differential function of the PSNR. As illustrated in FIG. 5, the differential function of the SSIM may have periods P1, P2, and P3 having lower values than the differential function of the PSNR. Like in FIG. 4B, the differential function of the SSIM may also depend on both the quantization parameter QP and the variance VAR '$\sigma^2$', and the periods P1, P2, and P3 may vary according to the variance VAR '$\sigma^2$'.

Referring to FIG. 5, in the period where the differential function of the SSIM is lower than the differential function of the PSNR, since the increment of the SSIM according to the decrease of the quantization parameter QP is greater than the increment of the PSNR, it may be advantageous to adjust the quantization parameter QP to increase the SSIM. On the other hand, in the period where the differential function of the PSNR is lower than the differential function of the SSIM, since the increment of the PSNR according to the decrease of the quantization parameter QP is greater than the increment of the SSIM, it may be advantageous to adjust the quantization parameter QP to increase the PSNR. However, since the influence of the SSIM and the PSNR on the quality index QI is determined by the first and second weights W1 and W2, the range of the quantization parameter QP, that is, the range of the quantization parameter QP needing to be adjusted to increase the SSIM or the range of the quantization parameter QP needing to be adjusted to increase the PSNR may be determined by both the variance VAR and the first and second weights W1 and W2 as described below with reference to FIG. 6.

Figure 6:
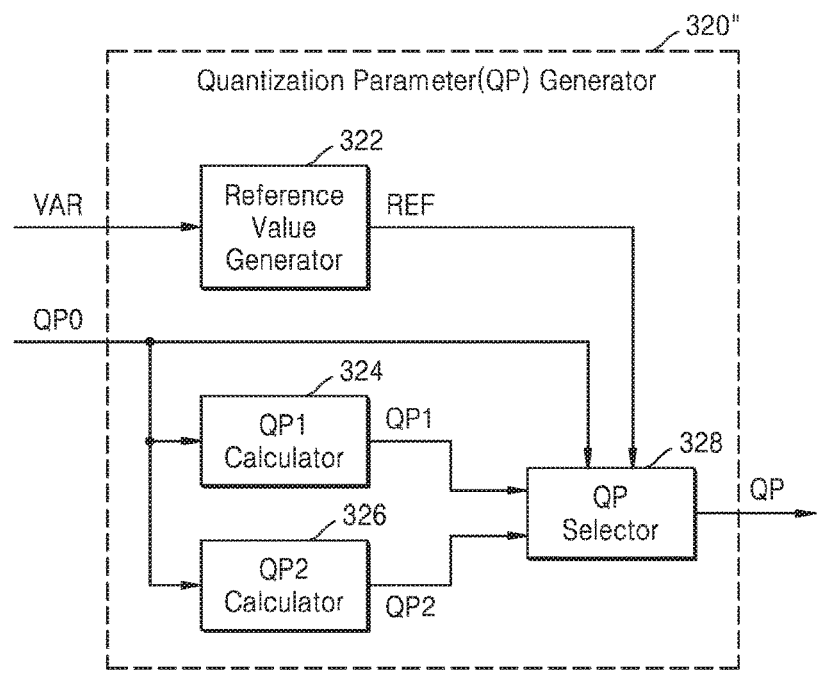
FIG. 6 is a block diagram illustrating an example of a quantization parameter generator of FIG. 3 according to at least one example embodiment of the inventive concepts.

FIG. 6 is a block diagram illustrating an example of the quantization parameter generator 320' of FIG. 3 according to at least one example embodiment of the inventive concepts. As described above with reference to FIG. 3, a quantization parameter generator 320" of FIG. 6 may receive the variance VAR and may generate the quantization parameter QP. As illustrated in FIG. 6, the quantization parameter generator 320" may include a reference value generator 322, a first quantization parameter calculator 324, a second quantization parameter calculator 326, and a quantization parameter selector 328. Operations described as being performed by the quantization parameter generator 320" (and/or any element of the quantization parameter generator 320") may be performed by circuitry configured to perform the operations, a processor executing program code that is stored in a memory and includes instructions corresponding to the operations, or a combination of the above-referenced circuitry and processor executing program code.

The quantization parameter generator 320" may compare an initial quantization parameter QP0 with at least one reference value REF and may select and output one of a first quantization parameter QP1 and a second quantization parameter QP2 as the quantization parameter QP according to a comparison result thereof. The initial quantization parameter QP0 may be predetermined with respect to the input data D_IN. For example, the initial quantization parameter QP0 may be received from the control module 100 of FIG. 1, and the control module 100 may determine the initial quantization parameter QP0 based on the bitrate of the bitstream generated by encoding the original video data 5. That is, a relatively small initial quantization parameter QP0 may be generated when there is a sufficient margin in the bitrate, and a relatively large initial quantization parameter QP0 may be generated when there is an insufficient margin in the bitrate. According to at least one example embodiment of the inventive concepts, unlike the illustration of FIG. 6, the initial quantization parameter QP0 may be generated in the quantization parameter generator 320".

The reference value generator 322 may receive the variance VAR and may generate at least one reference value REF. As described above with reference to FIG. 5, the at least one reference value REF may define the period where the quality index QI is more sensitive to the PSNR and the period where the quality index QI is more sensitive to the SSIM according to the change of the quantization parameter QP. For example, the quantization parameter QP set such that the ratio of the differential function of the PSNR of Equation 8 to the differential function of the SSIM of Equation 9 is equal to the ratio of the second weight W2 to the first weight W1 may be calculated as the at least one reference value REF. That is, the quantization parameter QP may be calculated to satisfy Equation 10 below.

$$\frac{\frac{dSSIM}{dQP}}{\frac{dPSNR}{dQP}} \approx \frac{\beta}{\left(\beta + \gamma \times 2^{\frac{QP}{3}}\right)^2} \times \gamma \times 2^{\frac{QP}{3}} \times \ln 2^{\frac{1}{3}} = \frac{W_1}{W_2} \qquad \text{Equation 10}$$

By Equation 10, a first reference value REF1 and a second reference value REF2 may be calculated as in Equation 11 and Equation 12 below.

$$REF1 = 3\log_2\left(\beta \times \frac{\delta - \sqrt{\delta^2 - 36}}{6\gamma}\right) \left(\delta = \frac{W_2}{W_1} \times \ln 2 - 6\right) \qquad \text{Equation 11}$$

$$REF2 = 3\log_2\left(\beta \times \frac{\delta + \sqrt{\delta^2 - 36}}{6\gamma}\right) \left(\delta = \frac{W_2}{W_1} \times \ln 2 - 6\right) \qquad \text{Equation 12}$$

Accordingly, when the initial quantization parameter QP0 is between the first reference value REF1 and the second reference value REF2, that is, when the ratio of the differential function of the PSNR to the differential function of the SSIM is greater than the ratio of the second weight W2 to the first weight W1, the quality index QI may be more sensitive to the SSIM than to the PSNR. On the other hand, when the initial quantization parameter QP0 is less than or equal to the first reference value REF1 or is greater than or equal to the second reference value REF2, that is, when the ratio of the differential function of the PSNR to the differential function of the SSIM is less than or equal to the ratio of the second weight W2 to the first weight W1, the quality index QI may be more sensitive to the PSNR than to the SSIM.

Referring to Equation 7, since 'β' is determined from the variance VAR 'σ2', when the first and second weights W1 and W2 and other constants are determined in Equations 11 and 12, each of the first and second reference values REF1 and REF2 may be represented as a function of the variance VAR 'σ$^2$' as in Equations 13 and 14 below.

$$REF1 = g(\sigma^2) \qquad \text{Equation 13}$$

$$REF2 = h(\sigma^2) \qquad \text{Equation 14}$$

Accordingly, the reference value generator 322 may generate at least one reference value REF including the first and second reference values REF1 and REF2 according to the variance VAR by using functions g and h of Equations 13 and 14. For example, referring to FIG. 5, when the variance VAR 'σ$^2$' is 50, the first and second reference values REF1 and REF2 derived from the functions g and h may respectively represent the lower limit and the upper limit of the period P1. The functions g and h may be referred to as reference value functions.

The first quantization parameter calculator 324 may receive the initial quantization parameter QP0 and may calculate the first quantization parameter QP1 for increasing the PSNR of the bitstream. For example, the first quantization parameter calculator 324 may calculate the first quantization parameter QP1 based on a scalable rate control (SRC) scheme proposed in "Scalable Rate Control for MPEG-4 Video" (H. Lee, T. Chiang, and Y. Zhang, IEEE Trans. CIRCUITS AND SYSTEMS FOR VIDEO TECHNOLOGY, Vol. 10, no. 6, pp. 878-894, September 2000), may calculate the first quantization parameter QP1 based on a rate-distortion model proposed in "Rate Control for H.264 Video With Enhanced Rate and Distortion Models" (D. Kwon, M. Shen, and C. J. Kuo, IEEE Trans. CIRCUITS AND SYSTEMS FOR VIDEO TECHNOLOGY, Vol. 17, no. 5, pp. 517-529, May 2007), or may calculate the first quantization parameter QP1 based on a bitrate-Lagrange multiplier (R-A) model proposed in "A Domain Rate Control Algorithm for High Efficiency Video Coding" (B. Li, H. Li, L. Li, and J. Zhang, IEEE Trans. IMAGE PROCESSING, Vol. 23, no. 9, 3841-3854, September 2014). The first quantization parameter calculator 324 may calculate the first quantization parameter QP1 for increasing the PSNR in various ways other than the above ways.

The second quantization parameter calculator 326 may receive the initial quantization parameter QP0 and may calculate the second quantization parameter QP2 for increasing the SSIM of the bitstream. For example, the second quantization parameter calculator 326 may calculate the second quantization parameter QP2 based on a rate-distortion optimization (RDO) method proposed in "On Rate Distortion Optimization Using SSIM" (C. Yeo, H. L. Tan, and Y. Tan, IEEE Trans. CIRCUITS AND SYSTEMS FOR VIDEO TECHNOLOGY, Vol. 23, no. 7, July 2013), or may calculate the second quantization parameter QP2 based on a quantization parameter selecting method proposed in "SSIM-based adaptive quantization in HEVC" (C. Yeo, H. L. Tan, and Y. H. Tan, in IEEE International Conference on Acoustics, Speech and Signal Processing (ICASSP), May 2013, pp. 1690-1694). The second quantization parameter calculator 326 may calculate the second quantization parameter QP2 for increasing the SSIM in various ways other than the above ways.

The quantization parameter selector 328 may receive the initial quantization parameter QP0 and the at least one reference value REF and may receive the first and second quantization parameters QP1 and QP2. The quantization parameter selector 328 may output one of the first and second quantization parameters QP1 and QP2 as the quantization parameter QP (i.e., the final quantization parameter QP) by comparing the initial quantization parameter QP0 and the at least one reference value REF. Details of the quantization parameter selector 328 will be described with reference to FIG. 7.

Figure 7:
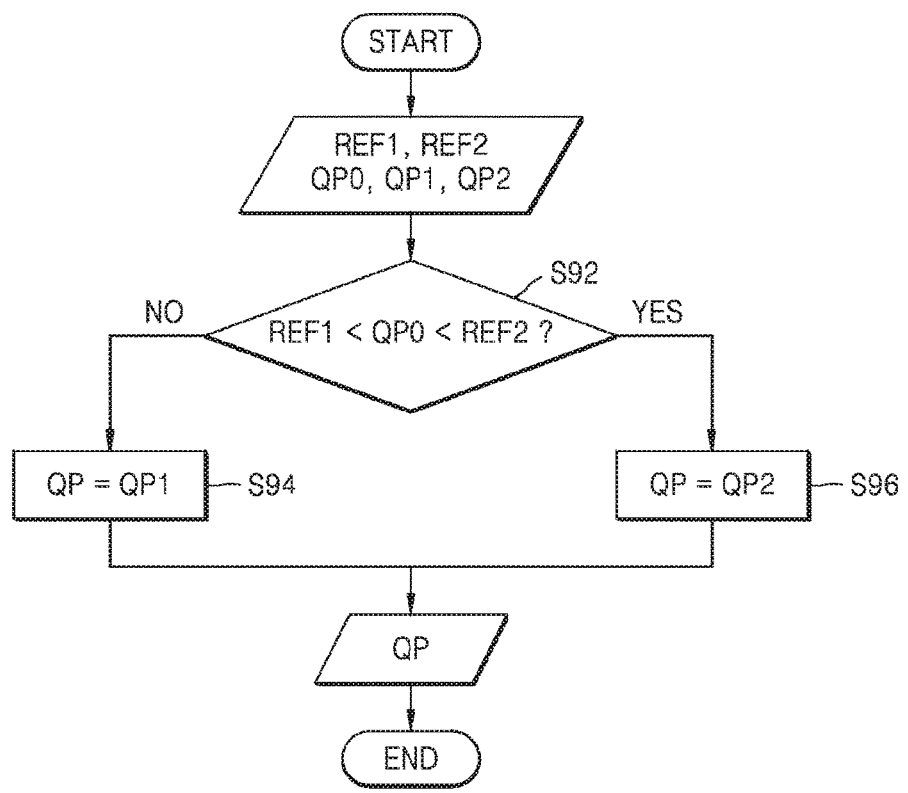
FIG. 7 is a flowchart illustrating an example of an operation of a quantization parameter selector of FIG. 6 according to at least one example embodiment of the inventive concepts.

FIG. 7 is a flowchart illustrating an example of an operation of the quantization parameter selector 328 of FIG. 6 according to at least one example embodiment of the inventive concepts. As described above with reference to FIG. 6, the quantization parameter selector 328 may receive the first and second reference values REF1 and REF2, the initial quantization parameter QP0, and the first and second quantization parameters QP1 and QP2, and may output the quantization parameter QP.

In operation S92, the quantization parameter selector 328 may compare the initial quantization parameter QP0 and each of the first and second reference values REF1 and REF2. For example, as illustrated in FIG. 7, the quantization parameter selector 328 may determine whether the initial quantization parameter QP0 is between the first and second reference values REF1 and REF2. In operation S94, when the initial quantization parameter QP0 is not between the first and second reference values REF1 and REF2, the quantization parameter selector 328 may determine the quantization parameter QP as the first quantization parameter QP1 for increasing the PSNR. On the other hand, in operation S96, when the initial quantization parameter QP0 is between the first and second reference values REF1 and REF2, the quantization parameter selector 328 may determine the quantization parameter QP as the second quantization parameter QP2 for increasing the SSIM.

Figure 8A:
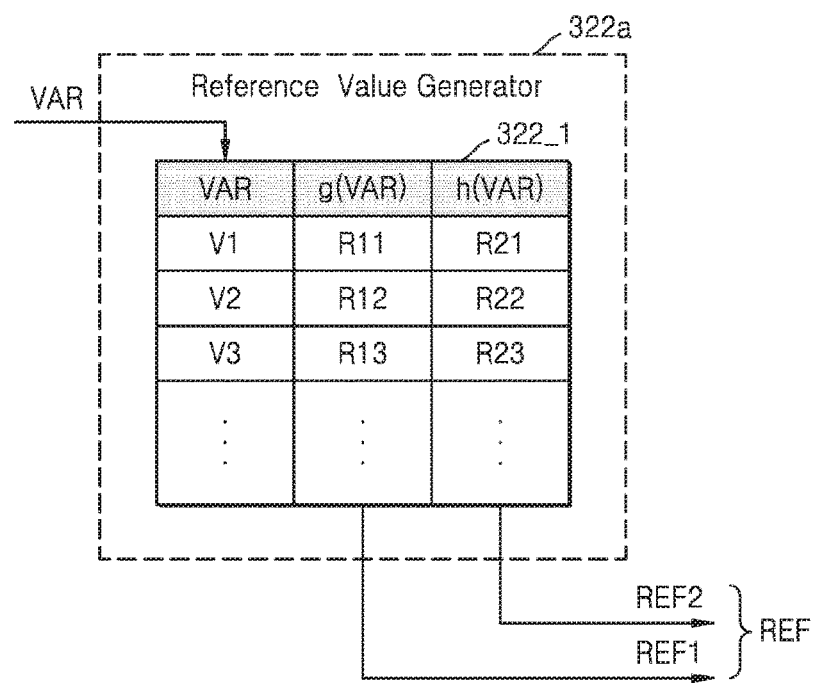
FIGS. 8A and 8B are block diagrams illustrating examples of a reference value generator of FIG. 6 according to at least some example embodiments of the inventive concepts.
Figure 8B:
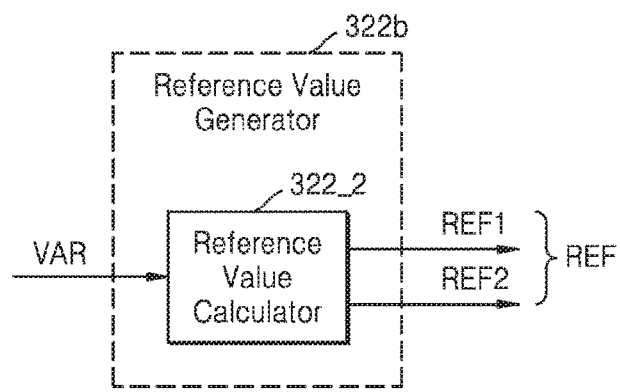

FIGS. 8A and 8B are block diagrams illustrating examples of the reference value generator 322 of FIG. 6 according to at least some example embodiments of the inventive concepts. As described above with reference to FIG. 6, a reference value generator 322a or 322b of FIGS. 8A and 8B may receive the variance VAR and may output the first and second reference values REF1 and REF2.

Referring to FIG. 8A, according to at least one example embodiment of the inventive concepts, the reference value generator 322a may include a lookup table 322_1. The lookup table 322_1 may be stored in a nonvolatile memory such as Flash Memory, EEPROM, PRAM, RRAM, MRAM, or FRAM, and may be stored in a volatile memory such as DRAM, SRAM, or Mobile DRAM by being loaded from a nonvolatile memory. The lookup table 322_1 may include a plurality of variance values (e.g., different variance values) and first and second reference values corresponding to the plurality of variance values. The first and second reference values may also be referred to, herein, as reference value function values. For example, as illustrated in FIG. 8A, the lookup table 322_1 may include, as a group, 'V2', 'R12' precalculated according to 'V2' by using the function 'g' of Equation 13, and 'R22' precalculated according to 'V2' by using the function 'h' of Equation 14. Accordingly, when the received variance VAR is 'V2', the reference value generator 322a may output 'R12' and 'R22' respectively as the first and second reference values REF1 and REF2. Operations described as being performed by the reference value generator 322a (and/or any element of the reference value generator 322a) may be performed by circuitry configured to perform the operations, a processor executing program code that is stored in a memory and includes instructions corresponding to the operations, or a combination of the above-referenced circuitry and processor executing program code.

Referring to FIG. 8B, according to at least one example embodiment of the inventive concepts, the reference value generator 322b may include a reference value calculator 322_2. That is, the reference value calculator 322_2 may generate the first and second reference values REF1 and REF2 by calculating directly according to the variance VAR by using the functions g and h of Equations 13 and 14. For example, when the reference value calculator 322_2 is a hardware module designed by logic synthesis, the reference value calculator 322_2 may include at least one multiplier and an adder and may include a register storing the operation results thereof. Operations described as being performed by the reference value generator 322b (and/or any element of the reference value generator 322b) may be performed by circuitry configured to perform the operations, a processor executing program code that is stored in a memory and includes instructions corresponding to the operations, or a combination of the above-referenced circuitry and processor executing program code.

Figure 9A:
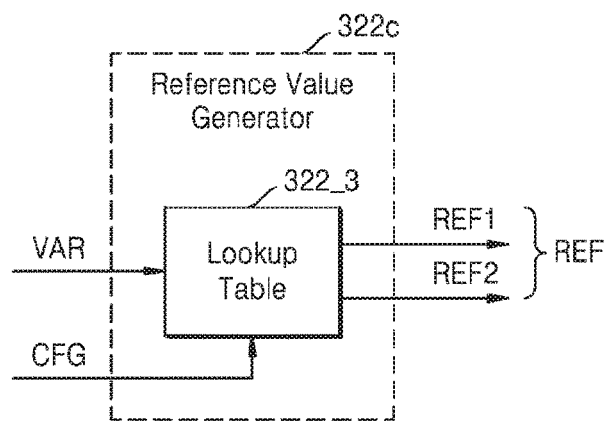
FIGS. 9A and 9B are block diagrams illustrating examples of the reference value generator of FIG. 6 according to at least some example embodiments of the inventive concepts.
Figure 9B:
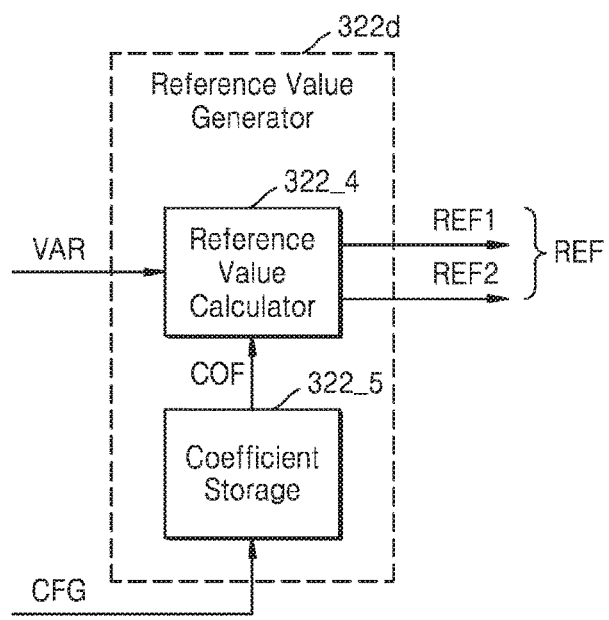

FIGS. 9A and 9B are block diagrams illustrating examples of the reference value generator 322 of FIG. 6 according to at least some example embodiments of the inventive concepts. As described above with reference to FIG. 6, a reference value generator 322c or 322d of FIGS. 9A and 9B may receive the variance VAR and may output the first and second reference values REF1 and REF2. In comparison with the reference value generator 322a or 322b of FIGS. 8A and 8B, the reference value generator 322c or 322d of FIGS. 9A and 9B may further receive a configuration signal CFG and may change a method of generating at least one reference value REF from the variance VAR in response to the configuration signal CFG. Operations described as being performed by the reference value generator 322c and/or 322d (and/or any element of the reference value generator 322c and/or 322d) may be performed by circuitry configured to perform the operations, a processor executing program code that is stored in a memory and includes instructions corresponding to the operations, or a combination of the above-referenced circuitry and processor executing program code.

Referring to FIG. 9A, the reference value generator 322c may include a lookup table 322_3. Like the lookup table 322_1 of FIG. 8A, the lookup table 322_3 may include a plurality of variance values and first and second reference values corresponding to the plurality of variance values. The lookup table 322_3 may receive a configuration signal CFG from outside the reference value generator 322c and may update a value included in the lookup table 322_3 in response to the configuration signal CFG. For example, in response to the configuration signal CFG, the lookup table 322_3 may update at least one variance value, at least one first reference value, or at least one second reference value included in the lookup table 322_3. Accordingly, when the video quality evaluation standard changes, for example, when the first and second weights W1 and W2 of the quality index QI change, the first and second reference values REF1 and REF2 may be updated by the configuration signal CFG.

Referring to FIG. 9B, the reference value generator 322d may include a reference value calculator 322_4 and a coefficient storage 322_5. Like the reference value calculator 322_2 of FIG. 8B, the reference value calculator 322_4 may calculate the first and second reference values REF1 and REF2 according to the variance VAR. The coefficient storage 322_5 may store at least one coefficient that is used by the reference value calculator 322_4 to calculate the first and second reference values REF1 and REF2 from the variance VAR. For example, the coefficient storage 322_5 may store any constant used in the above Equations. The coefficient storage 322_5 may be a nonvolatile memory such as Flash Memory, EEPROM, PRAM, RRAM, MRAM, or FRAM, and may be a register or a volatile memory such as DRAM, SRAM, or Mobile DRAM into which the coefficient is loaded from a nonvolatile memory.

The coefficient storage 322_5 may receive a configuration signal CFG from outside the reference value generator 322d and may update at least one coefficient stored in the coefficient storage 322_5 in response to the configuration signal CFG. For example, the coefficient storage 322_5 may store a first coefficient in a desired or, alternatively, predetermined space (e.g., an address region) and may change the first coefficient into a second coefficient in response to the configuration signal CFG. Accordingly, the reference value calculator 322_4 may calculate the first and second reference values REF1 and REF2 from the variance VAR based on the second coefficient.

Figure 10:
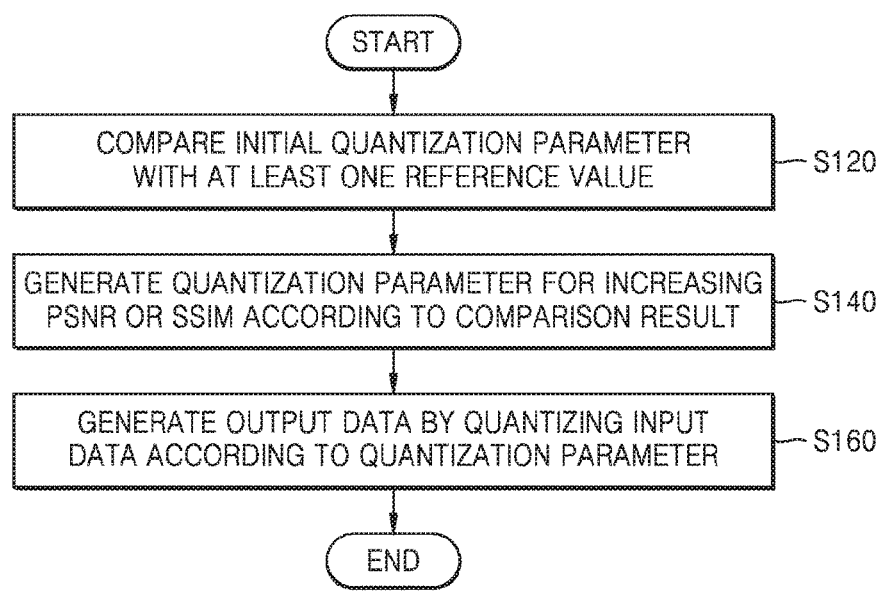
FIG. 10 is a flowchart illustrating a video encoding method according to at least one example embodiment of the inventive concepts.

FIG. 10 is a flowchart illustrating a video encoding method according to at least one example embodiment of the inventive concepts. For example, the video encoding method of FIG. 10 may be performed by the quantization module 300' of FIG. 3. As illustrated in FIG. 10, the video encoding method may include a plurality of operations S120, S140, and S160; and FIG. 10 will be described below with reference to FIG. 3.

In operation S120, the initial quantization parameter may be compared with at least one reference value. The at least one reference value REF may be determined based on the first and second weights W1 and W2 in the quality index QI defined as the weighted sum of the PSNR and the SSIM and the variance VAR of the original data D_ORG from which the input data D_IN is generated. The at least one reference value REF may define the period where the quality index QI is more sensitive to the PSNR and the period where the quality index QI is more sensitive to the SSIM according to the change of the quantization parameter QP. For example, the at least one reference value REF may include the first and second reference values REF1 and REF2, and the quality index QI may be more sensitive to the SSIM according to the change of the quantization parameter QP between the first and second reference values REF1 and REF2.

In operation S140, the PSNR or the SSIM may be increased according to the comparison result thereof. For example, when the initial quantization parameter QP0 is between the first and second reference values REF1 and REF2, the quantization parameter QP for increasing the SSIM may be generated. On the other hand, when the initial quantization parameter QP0 is not between the first and second reference values REF1 and REF2, the quantization parameter QP for increasing the PSNR may be generated. According to at least one example embodiment of the inventive concepts, both the first quantization parameter QP1 for increasing the PSNR and the second quantization parameter QP2 for increasing the SSIM may be calculated, and one of the first and second quantization parameters QP1 and QP2 may be selected according to the comparison between the initial quantization parameter QP0 and the at least one reference value REF.

In operation S160, the output data D_OUT may be generated by quantizing the input data D_IN according to the quantization parameter QP. For example, the quantization matrix may be determined according to the quantization parameter QP, and the input data D_IN may be quantized using the generated quantization matrix.

Figure 11:
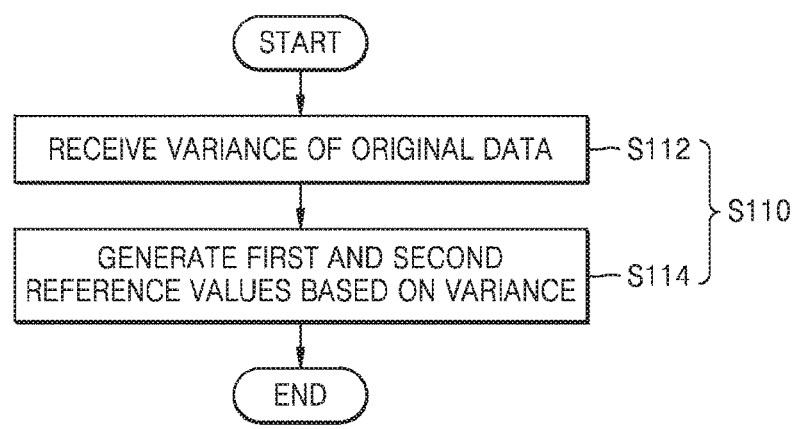
FIG. 11 is a flowchart illustrating a method of calculating at least one reference value of FIG. 10 according to at least one example embodiment of the inventive concepts.

FIG. 11 is a flowchart illustrating a method (S110) of calculating at least one reference value of FIG. 10 according to at least one example embodiment of the inventive concepts. In detail, FIG. 11 illustrates a method of generating the first and second reference values REF1 and REF2, and operation S110 of FIG. 11 may be performed before operation S120 of FIG. 10. According to at least one example embodiment of the inventive concepts, the method (S110) of calculating at least one reference value of FIG. 11 may be performed by the reference value generator 322a or 322b of FIGS. 8A and 8B. Hereinafter, FIG. 11 will be described with reference to FIG. 8B.

In operation S112, the variance VAR of the original data D_ORG may be received. For example, the reference value generator 322b may receive the variance of the pixels included in the original data D_ORG. Referring to Equation 6, since the SSIM depends on the variance 'σ2' of the original data D_ORG, the reference value generator 322b may receive the variance VAR of the original data D_ORG.

In operation S114, the first and second reference values REF1 and REF2 may be generated based on the variance VAR. For example, the reference value generator 322b may generate the first and second reference values REF1 and REF2 by using the reference value functions (e.g., the functions g and h of Equations 13 and 14) defined based on the first and second weights W1 and W2 in the quality index QI as a function of the variance VAR of the original data D_ORG. In detail, in the reference value functions, the first and second reference values REF1 and REF2 may be derived from the value of the quantization parameter QP when the ratio of a first differential function obtained by differentiating the PSNR by the quantization parameter QP to a second differential function obtained by differentiating the SSIM by the quantization parameter QP is equal to the ratio of the second weight to the first weight.

Figure 12:
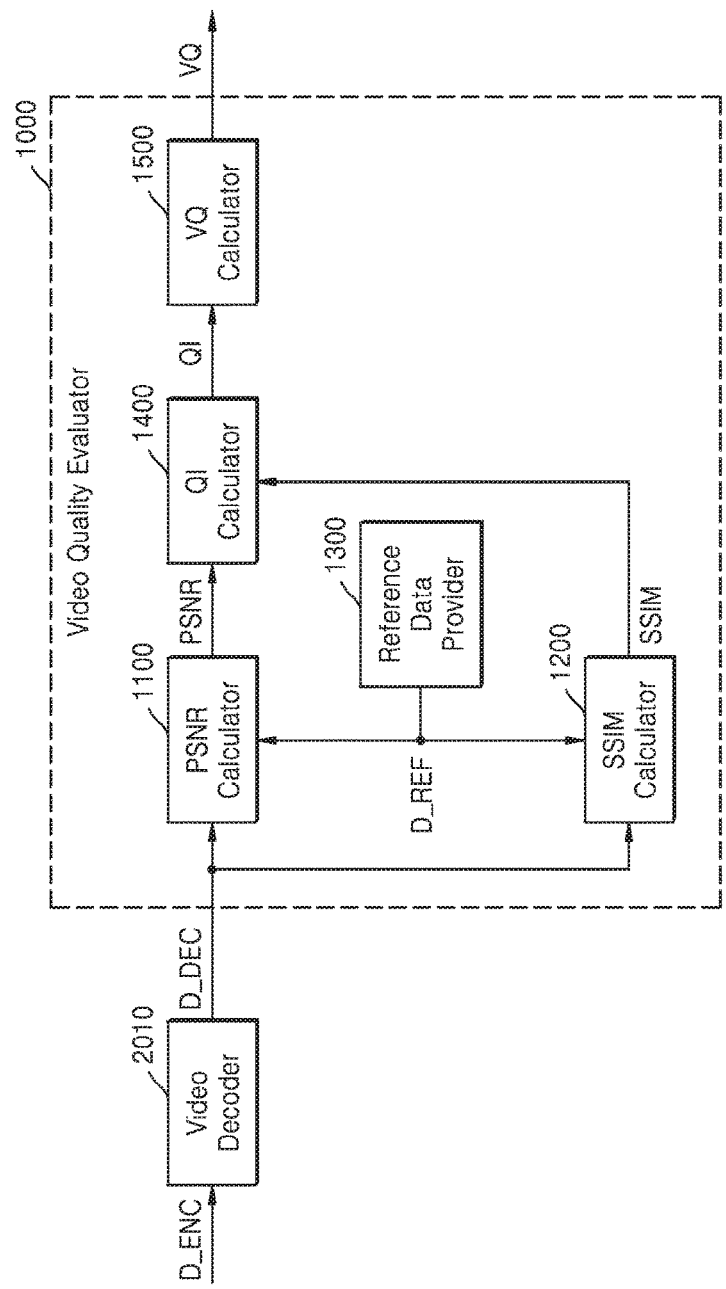
FIG. 12 is a block diagram illustrating a video quality evaluator according to at least one example embodiment of the inventive concepts.

FIG. 12 is a block diagram illustrating a video quality evaluator 1000 according to at least one example embodiment of the inventive concepts. The video quality evaluator 1000 may be a computing system processing data. For example, the video quality evaluator 1000 may be a personal computing system such as a desktop PC, a laptop PC, or a tablet PC, and may be a computing system such as a server or a workstation. As illustrated in FIG. 12, the video quality evaluator 1000 may receive decoded data D_DEC generated by decoding encoded data D_ENC by a video decoder 2010, and may output a video quality index VQ. The video quality evaluator 1000 may include a PSNR calculator 1100, an SSIM calculator 1200, a reference data provider 1300, a quality index calculator 1400, and a video quality index (VQ) calculator 1500.

According to at least one example embodiment of the inventive concepts, the video quality evaluator 1000 may evaluate video quality based on a weighted sum of an objective evaluation value and a subjective evaluation value. For example, as illustrated in FIG. 12, the video quality evaluator 1000 may include the PSNR calculator 1100 calculating a PSNR as an example of the objective evaluation value and the SSIM calculator 1200 calculating an SSIM as an example of the subjective evaluation value, and may evaluate the video quality based on a weighted sum of the PSNR and the SSIM.

The reference data provider 1300 may provide reference data D_REF to the PSNR calculator 1100 and the SSIM calculator 1200. The reference data D_REF may be equal to the original data from which the encoded data D_ENC is generated by a video encoder.

The PSNR calculator 1100 may calculate a PSNR based on the decoded data D_DEC and the reference data D_REF. For example, the PSNR calculator 1100 may calculate an MSE based on the decoded data D_DEC and the reference data D_REF and may calculate the PSNR based on the MSE. Similarly, the SSIM calculator 1200 may calculate an SSIM based on the decoded data D_DEC and the reference data D_REF.

The quality index calculator 1400 may calculate a quality index QI as a weighted sum of the PSNR and the SSIM. For example, the quality index calculator 1400 may calculate the weighted sum of the PSNR and the SSIM by using the first and second weights W1 and W2 as in Equation 1. As described above with reference to FIG. 2, based on the relationship between an MOS and a PSNR and the relationship between an MOS and an SSIM, the first and second weights W1 and W2 may be determined such that the MOS and the quality index are in a linear relationship. According to at least one example embodiment of the inventive concepts, the quality index calculator 1400 may restrict the PSNR to the upper limit and may calculate the quality index QI as the weighted sum of the PSNR and the SSIM. Also, the second weight W2 may be the product of a scale factor for matching the ranges of the PSNR and the SSIM and an SSIM factor WS set such that the sum with the first weight W1 is constant.

The video quality index calculator 1500 may receive the quality index QI and may calculate the video quality index VQ based on a plurality of quality indexes QI. The quality index QI may correspond to one frame or one block included in the frame. Accordingly, the video quality index calculator 1500 may receive a plurality of quality indexes QI and may calculate the video quality index VQ of a frame sequence based on the plurality of quality indexes QI, for example, by averaging or filtering the plurality of quality indexes QI.

Figure 13:
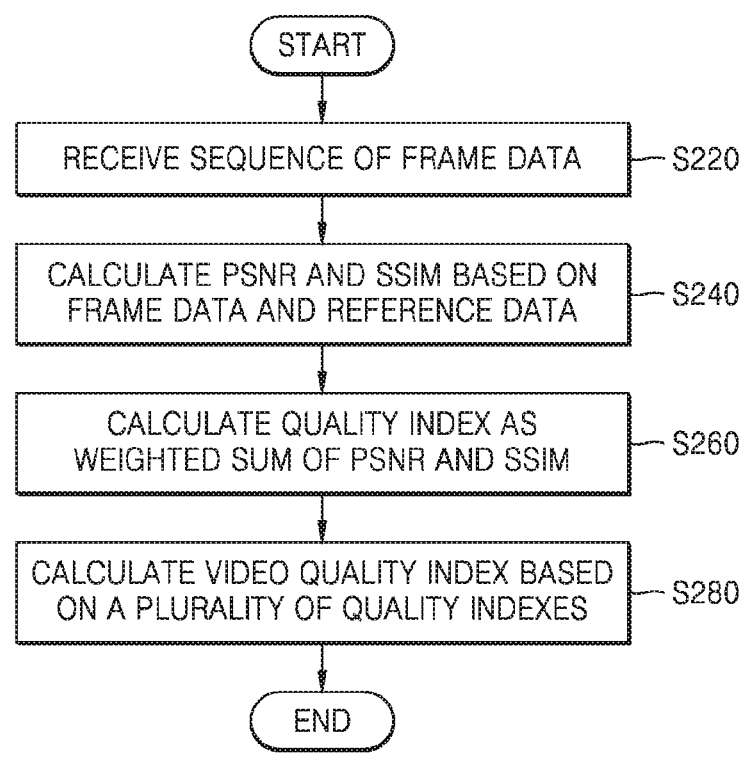
FIG. 13 is a flowchart illustrating a method of evaluating a video quality according to at least one example embodiment of the inventive concepts.

FIG. 13 is a flowchart illustrating a method of evaluating video quality according to at least one example embodiment of the inventive concepts. According to at least one example embodiment of the inventive concepts, the video quality evaluating method of FIG. 13 may be performed by the video quality evaluator 1000 of FIG. 12. As illustrated in FIG. 13, the video quality evaluating method may include a plurality of operations S220 S240, S260, and S280.

In operation S220, a sequence of frame data may be received. A frame sequence may be data generated by decoding a bitstream. Thereafter, in operation S240, the PSNR and the SSIM may be calculated based on the frame data and the reference data. The PSNR and the SSIM may correspond to one frame or may correspond to one of a plurality of blocks included in the frame.

In operation S260, the quality index QI may be calculated as a weighted sum of the PSNR and the SSIM. In the weighted sum, based on the relationship between the MOS and the PSNR and the relationship between the MOS and the SSIM, the first weight W1 of the PSNR and the second weight W2 of the SSIM may be determined such that the MOS and the quality index QI are in a substantially linear relationship. According to at least one example embodiment of the inventive concepts, the second weight W2 may be the product of a scale factor for matching the ranges of the PSNR and the SSIM and an SSIM factor WS set such that the sum with the first weight W1 is constant.

In operation S280, the video quality index VQ may be calculated based on a plurality of quality indexes QI. The quality index QI may correspond to one frame or one block included in the frame, and thus, the video quality index VQ corresponding to the sequence of the frame data may be calculated based on the plurality of quality indexes QI.

Figure 14:
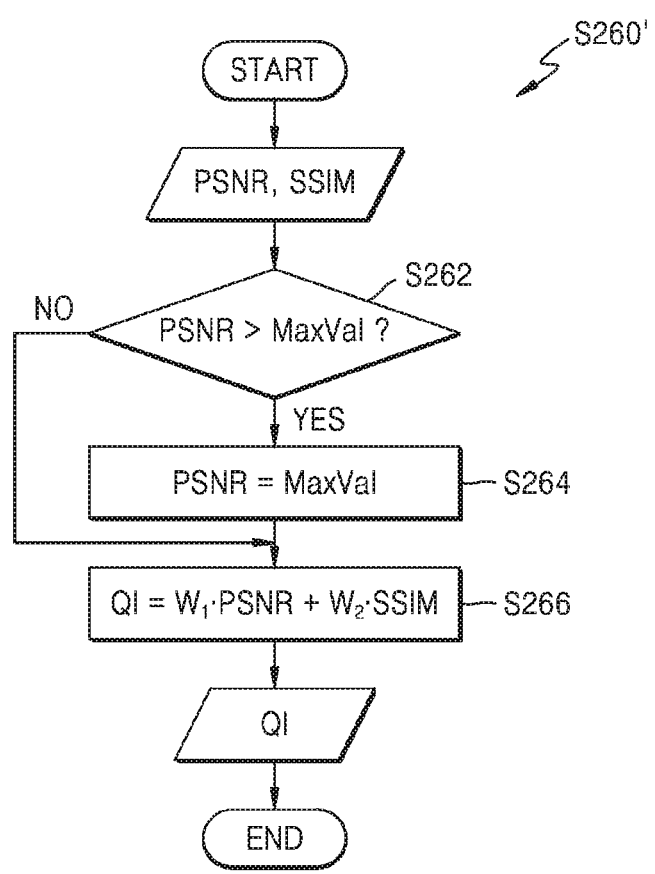
FIG. 14 is a flowchart illustrating an example of operation S260 of FIG. 13 according to at least one example embodiment of the inventive concepts.

FIG. 14 is a flowchart illustrating an example of operation S260 of FIG. 13 according to at least one example embodiment of the inventive concepts. As described above with reference to FIG. 13, in operation S260' of FIG. 14, the quality index QI may be calculated as a weighted sum of the PSNR and the SSIM.

In operation S262, the PSNR may be compared with the upper limit 'MaxVal' of the PSNR. In operation S264, when the PSNR is greater than 'MaxVal', the PSNR may be set to 'MaxVal'. The PSNR may have an infinite value by definition (PSNR=10 log(s2/MSE)), and a deviation of the PSNR may be disregarded at a certain level or above. Thus, the PSNR may be restricted to 'MaxVal', and 'MaxVal' may be 50 according to at least one example embodiment of the inventive concepts. Thereafter, in operation S266, the quality index QI may be calculated as a weighted sum of the PSNR and the SSIM.

Figure 15:
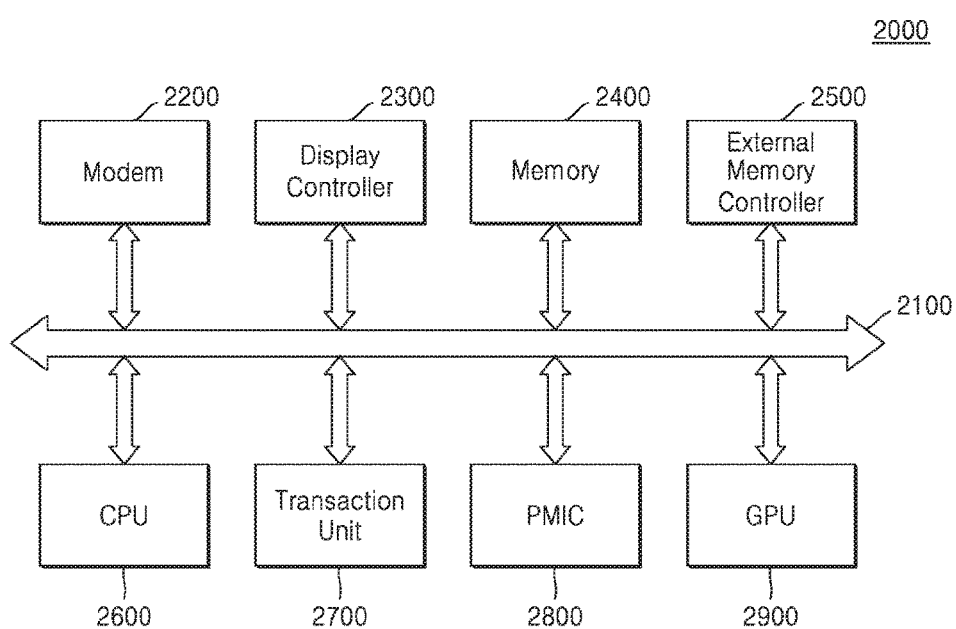
FIG. 15 is a block diagram illustrating a system-on-chip (SoC) according to at least one example embodiment of the inventive concepts.

FIG. 15 is a block diagram illustrating a system-on-chip (SoC) 2000 according to at least one example embodiment of the inventive concepts. As a semiconductor apparatus, the SoC 2000 may include a video encoder or perform a video encoding method according to at least one example embodiment of the inventive concepts. Also, the SoC 2000 may perform a video quality evaluating method according to at least one example embodiment of the inventive concepts. As the implementation of complex functional blocks (e.g., intellectual property (IP)) performing various functions on one chip, the SoC 2000 may generate encoded data (i.e., bitstream) providing an improved image quality by performing a video encoding method according to at least one example embodiment of the inventive concepts.

Referring to FIG. 15, the SoC 2000 may include a modem 2200, a display controller 2300, a memory 2400, an external memory controller 2500, a central processing unit (CPU) 2600, a transaction unit 2700, a power management integrated circuit (PMIC) 2800, and a GPU 2900, and the respective functional blocks of the SoC 2000 may communicate with each other through a system bus 2100.

The CPU 2600 capable of controlling all operations of the SoC 2000 may control the operations of other functional blocks 2200, 2300, 2400, 2500, 2700, 2800, and 2900. According to at least one example embodiment of the inventive concepts, the CPU 2600 may perform a video encoding method according to at least one example embodiment of the inventive concepts by executing the instructions stored in the memory 2400. For example, the CPU 2600 may generate a bitstream by encoding the original data received from the external memory controller 2500 and may transmit the generated bitstream to the modem 2200. According to at least one other example embodiment of the inventive concepts, the CPU 2600 may perform a video quality evaluating method according to at least one example embodiment of the inventive concepts by executing the instructions stored in the memory 2400. For example, the CPU 2600 may decode the bitstream received from the external memory controller 2500 or received from the modem 2200 and may evaluate the video quality based on the decoded data.

The modem 2200 may demodulate the signals received from outside the SoC 2000 or may modulate the signals generated in the SoC 2000 and transmit the modulated signals to the outside. The external memory controller 2500 may control an operation of transmitting/receiving data to/from an external memory apparatus connected to the SoC 2000. For example, the program and/or data stored in the external memory apparatus may be provided to the CPU 2600 or the GPU 2900 under the control of the external memory controller 2500.

The GPU 2900 may execute the program instructions related to graphics processing. The GPU 2900 may receive graphic data through the external memory controller 2500, and may transmit the graphic data processed by the GPU 2900 to the outside of the SoC 2000 through the external memory controller 2500. According to at least one example embodiment of the inventive concepts, the GPU 2900 may perform a video encoding method according to at least one example embodiment of the inventive concepts. For example, the GPU 2900 may generate a bitstream by encoding the original data received from the external memory controller 2500 and may transmit the generated bitstream to the modem 2200.

The transaction unit 2700 may monitor the data transaction of the respective functional blocks, and the PMIC 2800 may control the power supplied to each functional block according to the control of the transaction unit 2700. By controlling a display (or display apparatus) outside the SoC 2000, the display controller 2300 may transmit the data generated in the SoC 2000 to the display.

The memory 2400 may include a nonvolatile memory such as Electrically Erasable Programmable Read-Only Memory (EEPROM), Flash Memory, Phase Change Random Access Memory (PRAM), Resistance Random Access Memory (RRAM), Nano Floating Gate Memory (NFGM), Polymer Random Access Memory (PoRAM), Magnetic Random Access Memory (MRAM), or Ferroelectric Random Access Memory (FRAM), and may include a volatile memory such as Dynamic Random Access Memory (DRAM), Static Random Access Memory (SRAM), Mobile DRAM, Double Data Rate Synchronous Dynamic Random Access Memory (DDR SDRAM), Low Power DDR (LPDDR) SDRAM, Graphic DDR (GDDR) SDRAM, or Rambus Dynamic Random Access Memory (RDRAM). The memory 2400 may store the above original data or bitstream.

Example embodiments of the inventive concepts having thus been described, it will be obvious that the same may be varied in many ways. Such variations are not to be regarded as a departure from the intended spirit and scope of example embodiments of the inventive concepts, and all such modifications as would be obvious to one skilled in the art are intended to be included within the scope of the following claims.

What is claimed is:

1. An apparatus for encoding video comprising:
a quantizer configured to, based on a size of an initial quantization parameter of input data,
generate output data by quantizing the input data to increase an objective evaluation value of encoded data generated from the output data in response to the size of the initial quantization parameter of the input data being outside at least one range, and
generate the output data by quantizing the input data to increase a subjective evaluation value of the encoded data in response to the size of the initial quantization parameter of the input data being inside the at least one range.

2. The apparatus of claim 1, wherein the quantizer comprises:
a quantization parameter generator configured to,
compare the initial quantization parameter with at least one reference value, the at least one range being defined by the at least one reference value,
generate a first quantization parameter for increasing the objective evaluation value, and
generate a second quantization parameter for increasing the subjective evaluation value,
select, as a final quantization parameter, one of the first quantization parameter and the second quantization parameter, according to a result of the comparing; and
a quantization processor configured to generate the output data by quantizing the input data according to the final quantization parameter.

3. The apparatus of claim 2, wherein the quantization parameter generator is configured to generate the at least one reference value by using a reference value function,
the reference value function being defined based on first and second weights of a weighted sum that defines a quality index,
the weighted sum defining the quality index being a weighted sum of the objective evaluation value and the subjective evaluation value,
the objective evaluation value and the subjective evaluation value each being functions of an original data variance, the original data variance being a variance of original data from which the input data is generated.

4. The apparatus of claim 3, wherein,
the reference value function is a function that is derived from a quantization parameter when a first ratio is equal to a ratio of the second weight to the first weight, the first ratio being a ratio of a first differential function obtained by differentiating a first function representing the objective evaluation value by a quantization parameter to a second differential function obtained by differentiating a second function representing the subjective evaluation value by a quantization parameter, and
the quantization parameter generator is configured to generate first and second reference values according to the original data variance by using the reference value function.

5. The apparatus of claim 4, wherein the quantization parameter generator is configured to,
select, as the final quantization parameter, the second quantization parameter, when the initial quantization parameter is between the first and second reference values, and
select, as the final quantization parameter, the first quantization parameter, when the initial quantization parameter is not between the first and second reference values.

6. The apparatus of claim 3, wherein the quantization parameter generator comprises:
a lookup table including a plurality of variance values and reference value function values according to the plurality of variance values.

7. The apparatus of claim 2, wherein,
the input data is data generated by transforming residual data,
the residual data is data generated by subtracting prediction data from original data,
the original data includes a block among a plurality of blocks included in an image frame, and
select, as the final quantization parameter, one of the first quantization parameter and the second quantization parameter, based on the block.

8. The apparatus of claim 1, wherein,
the objective evaluation value includes a peak signal-to-noise ratio (PSNR), and
the subjective evaluation value includes a structural similarity index (SSIM) or a multiscale SSIM (MS-SSIM).

9. An apparatus for encoding video comprising:
a quantization parameter generator configured to,
perform a comparison operation based on an initial quantization parameter of input data and at least one reference value,
generate, as a final quantization parameter, a quantization parameter for increasing a structural similarity index (SSIM) of encoded data generated from output data when a result of the comparison operation indicates that the initial quantization parameter is inside at least one range, and
generate, as the final quantization parameter, a quantization parameter for increasing a peak signal-to-noise ratio (PSNR) of encoded data generated from the output data when a result of the comparison operation indicates that the initial quantization parameter is outside the at least one range; and
a quantization processor configured to generate the output data by quantizing the input data according to the final quantization parameter.

10. The apparatus of claim 9, wherein the quantization parameter generator comprises:
a reference value generator configured to generate the at least one reference value by using a reference value function,
the reference value function being defined based on first and second weights of a weighted sum that defines a quality index, the weighted sum defining the quality index being a weighted sum of the PSNR and the SSIM,
the PSNR and SSIM each being functions of an original data variance, the original data variance being a variance of original data from which the input data is generated.

11. The apparatus of claim 10, wherein,
the reference value generator is configured such that the reference value function is derived from a quantization parameter when a first ratio is equal to a ratio of the second weight to the first weight,
the first ratio being a ratio of a first differential function obtained by differentiating a first function representing the PSNR by a quantization parameter to a second differential function obtained by differentiating a second function representing the SSIM by a quantization parameter, and
the reference value generator is configured to generate first and second reference values according to the original data variance by using the reference value function.

12. The apparatus of claim 11, wherein the quantization parameter generator further comprises:
a first quantization parameter calculator configured to calculate a first quantization parameter for increasing the PSNR;
a second quantization parameter calculator configured to calculate a second quantization parameter for increasing the SSIM; and
a quantization parameter selector configured to,
output the second quantization parameter as the final quantization parameter when the initial quantization parameter is between the first and second reference values, and
output the first quantization parameter as the final quantization parameter when the initial quantization parameter is not between the first and second reference values.

13. The apparatus of claim 10, wherein the second weight is a product of a scale factor for matching a range of the SSIM with a range of the PSNR and an SSIM factor set such that a sum with the first weight is constant.

14. The apparatus of claim 10, wherein the reference value generator includes a lookup table including a plurality of variance values and reference value function values according to the plurality of variance values.

15. The apparatus of claim 14, wherein the reference value generator is configured to update the lookup table in response to a configuration signal received from outside the reference value generator.

16. The apparatus of claim 9, wherein,
the input data is data generated by transforming residual data, and
the residual data is data generated by subtracting prediction data from original data.

17. A video encoder comprising:
a quantization parameter generator configured to,
generate, based on a variance of original video data, at least one range,
generate, as a final quantization parameter, a first quantization parameter, in response to an initial quantization parameter being outside the at least one range, and
generate, as the final quantization parameter, a second quantization parameter different than that first quantization parameter, in response to the initial quantization parameter being inside the at least one range; and
a quantization processor configured to generate output video data by quantizing input video data according to the final quantization parameter,
the input video data being a transformed version of at least a portion of the original video data.

18. The video encoder of claim 17, wherein the quantization parameter generator is configured to,
generate reference values based on the variance, and
select, as the final quantization parameter, one of the first quantization parameter and the second quantization parameter, based on the initial quantization parameter and the reference values,
the at least one range being defined by the reference values.

19. The video encoder of claim 18, wherein,
the quantization processor is configured to output the output video data as a bitstream,
the first quantization parameter is a quantization parameter for increasing a peak signal-to-noise ratio (PSNR) of the bitstream, and
the second quantization parameter is a quantization parameter for increasing a structural similarity index (SSIM) of the bitstream.

20. The video encoder of claim 18, wherein the quantization parameter generator is configured to generate the reference values by using a lookup table that includes a plurality of different variance values and reference values corresponding to each variance value from among the plurality of different variance values.

* * * * *